US005250358A

United States Patent [19]

Lombard et al.

[11] Patent Number: 5,250,358

[45] Date of Patent: Oct. 5, 1993

[54] PALLADIUM THICK FILM RESISTOR CONTAINING BORON NITRIDE

[75] Inventors: James H. Lombard; Leonard J. Anderson, both of Albuquerque, N. Mex.

[73] Assignee: Motorola, Inc., Schaumburg, Ill.

[21] Appl. No.: 939,223

[22] Filed: Sep. 2, 1992

[51] Int. Cl.[5] .......... B32B 9/00; H01B 1/02; C23C 20/02; C23C 20/00

[52] U.S. Cl. .......... 428/427; 106/1.14; 106/1.15; 106/1.28; 252/514; 252/521; 428/434

[58] Field of Search .......... 106/1.11, 1.13, 1.14, 106/1.15, 1.28; 428/469, 472, 209, 210, 428, 432, 697, 698, 701, 704, 901, 427, 432; 252/512, 514, 521

[56] References Cited

U.S. PATENT DOCUMENTS

| | | | |
|---|---|---|---|
| 3,450,545 | 6/1969 | Ballard et al. | 106/1.13 |
| 4,051,074 | 9/1977 | Asada | 252/512 |
| 4,490,318 | 12/1984 | Masuyama et al. | 264/61 |
| 5,019,306 | 5/1991 | Huang et al. | 264/66 |

OTHER PUBLICATIONS

Hoffman, L. C., "An Overview of Thick Film Hybrid Materials" Ceramic Bulletin, vol. 63, No. 4 (1984), pp. 572-576.

Melan et al., "The Glaze Resistor-Its Structure and Reliability", (publication and publication date notvailable).

*Primary Examiner*—Mark L. Bell
*Assistant Examiner*—Margaret Einsmann
*Attorney, Agent, or Firm*—Douglas D. Fekete

[57] ABSTRACT

An electrically resistive film of the type used for forming thick film resistors is formed predominantly of palladium and includes an addition of boron nitride to increase resistance, preferably in combination with tantalum oxide. A paste of palladium powder and boron nitride powder dispersed in a vaporizable vehicle is applied to a substrate and sintered to form the film. In a preferred embodiment, the substrate is a ceramic powder compact that is concurrently sintered in a co-firing process.

21 Claims, No Drawings

PALLADIUM THICK FILM RESISTOR CONTAINING BORON NITRIDE

BACKGROUND OF THE INVENTION

This invention relates to a thick film resistor of the type that is formed by applying a powder paste and sintering. More particularly, this invention relates to such resistor formed of a predominantly palladium film containing boron nitride to increase electrical resistance.

In the manufacture of electronic components, thick film resistors are formed by applying a powder paste to a substrate and heating to sinter the powder to form a film. In a typical example, the paste comprises a mixture of metallic and nonmetallic powders dispersed in a liquid vehicle that permits the paste to be conveniently applied, for example, by spraying or screen printing. The vehicle contains an expendable binder that holds the particles into a layer after the paste is applied and dried. Upon heating, the binder decomposes, and the powders are sintered to produce an integral film and to bond the film to the substrate, thereby forming the resistor.

It is also advantageous to concurrently form a thick film element and a substrate by a co-firing process. For this purpose, the paste is applied to a substrate that is a compact of ceramic powder typically bonded by an expendable organic binder. Thereafter, during heating, the ceramic is sintered into an integral substrate, while the particulate layer is concurrently sintered to form the element.

Common commercial paste for forming thick film resistors include a mixture of silver powder and one or more powders, of a glass or ceramic composition. Such silver powder pastes are limited to sintering temperatures less than about 1,000° C. It is desired to utilize substrates formed of alkaline earth metal titanate compounds, such as strontium calcium titanate (SCT), that require relatively high sintering temperatures greater than about 1,250° C. Thus, silver powder pastes are not suitable for co-sintering with metal titanates at the higher temperatures. Moreover, additives formed of glass or other ceramics that are suitable at silver sintering temperatures may not be useful for sintering at the higher temperatures, particularly if added in relatively high concentrations to modify film resistance. Therefore, there is a need for an electrically resistive film for forming thick film resistors and the like, which film is derived from a paste and is sintered at a high temperature such as is encountered in a co-firing process that forms a metal titanate substrate.

SUMMARY OF THE INVENTION

This invention contemplates an electrically resistive film that is characterized by a sintered composition including palladium metal and boron nitride. It is found that the addition of boron nitride increases the electrical resistance of the otherwise highly conductive palladium to a level effective for use as a thick film resistor. The film optionally may contain tantalum oxide and other additives to enhance sinterability and electrical properties.

In a preferred embodiment, the film is formed from paste, also of this invention, that includes a vaporizable liquid vehicle and a mixture of powders dispersed in the vehicle. The mixture includes sinterable palladium powder and boron nitride powder. A preferred mixture comprises between about 1 and 15 weight percent boron nitride powder and between about 80 and 92 weight percent palladium powder. Optionally, the mixture may include minor additions of tantalum oxide powder, silver powder, alkaline earth titanate powder, calcium oxide borosilicate glass powder and the like. In accordance with a preferred process of this invention, the paste is applied to a substrate to form a particulate layer, whereafter the layer is heated to sinter the palladium powder to form a film. In a particularly advantageous aspect of this invention, the paste is applied to a compact composed of a ceramic powder, preferably of an alkaline earth metal titanate compound, which is concurrently sintered to bond the substrate in a co-firing process.

Therefore, this invention provides an electrically resistive film that is advantageously formed from a paste that may be conveniently applied, for example, by spraying or screen printing. It is found that the addition of boron nitride within the preferred ranges increases the electrical resistance above about 150 milliohms, while producing a film having a high physical integrity that adheres tightly to the substrate. Thus, the film is particularly useful as a thick film resistor in an electrical component. Furthermore, the predominantly palladium paste is sinterable at temperatures up to about 1,400° F., and preferably greater than 1,250° C. Thus, this invention is adapted for manufacturing an electrical component that features a thick film resistor on a co-fired ceramic substrate, thereby permitting the component to be formed in a single firing operation.

DESCRIPTION OF A PREFERRED EMBODIMENT

In a preferred embodiment, this invention is utilized to form a thick film resistor on a substrate that is concurrently sintered in a co-firing process. A preferred substrate is formed of a maganese-modified strontium calcium titanate ceramic, referred to as SCT. A preferred manganese-modified strontium calcium titanate is described in U.S. Pat. No. 5,019,306, issued to Huang et al. in 1991, and incorporated herein by reference. In general, the preferred material is characterized by the formula $(Sr_x Ca_y Mn_z)TiO_3$ in which $0.98<x+y+z<1.02$, $0.34<y<0.4$ and $0.0075<z<0.015$.

In a specific example, SCT powder was prepared from a mixture composed of, by weight, about 48.6 parts powdered strontium carbonate, $SrCO_3$, about 13.4 parts powdered calcium carbonate, $CaCO_3$, about 37.6 parts powdered titanium dioxide, $TiO_2$, and about 0.4 parts powdered manganese titanate, $MnTiO_3$. The mixture was blended using a water-base lubricant, dried at about 95° C., and calcined at a temperature between about 1,125° C. and 1,175° C. for a period of about 4 hours. The calcined product was pulverized to produce a powder. The resulting SCT powder had a formula in accordance with $(Sr_x Ca_y Mn_z)TiO_3$ wherein x is about 0.63, y is about 0.36 and z is about 0.01.

In accordance with a first preferred embodiment of this invention, a paste was prepared by dispersing a mixture of powders in a vaporizable liquid vehicle. The mixture was composed of, by weight, 4.7 percent SCT powder of the described composition, 0.95 percent calcium oxide borosilicate glass powder, 2.3 percent silver powder, 5.0 percent boron nitride powder, and the balance palladium powder. As used herein, composition of the mixture, as well as the sintered film produced therefrom, is characterized based upon the combined weight of the powders, exclusive of the liquid vehicle, it being understood that the proportion of liquid vehicle may be readily varied to facilitate application. Commercial purity powders were readily obtained. The composition of the calcium oxide borosilicate glass was characterized as about 45.5 weight percent calcium oxide, CaO, 10.6 percent boron oxide, $B_2O_3$, 39.8 percent silicon dioxide, $SiO_2$. Particle sizes for the powders were between about 0.5 and 1.5 microns. The vehicle was prepared by dissolving about 5 weight percent ethyl cellulose, about 0.9 weight percent isopropyl palmitate added as a plasticizer, and about 0.4 weight percent of a dispersant in alpha terpineol. The ethyl cellulose serves as an expendable organic binder for temporarily binding the several powders into a particulate film prior to sintering. A suitable dispersant is a polypropoxylated quaternary ammonium chloride compound. Prior to formulation, the powders were blended to obtain a uniform mixture. About 55 part by weight of the powder mixture was blended with about 45 parts by weight of the vehicle to produce the paste.

A sinterable base was prepared by a tape casting process using a slurry composed of 99 parts by weight of the described SCT powder and about 1 part by weight calcium titanium silicate, $CaTiSiO_5$, dispersed in a vaporizable liquid solvent vehicle containing an expendable organic binder. The slurry was cast and dried to produce a self-sustaining green tape which provided a suitable substrate. The paste was applied by screen printing and drying to produce a predominantly palladium particulate layer having a thickness of about 10 microns. The coated base was heated in air to a temperature between about 1,285° C. and 1,320° C., and preferably between 1,290° C. and 1,310° C., for about 2.5 hours. During the early stages of heating, the organic binders for the layer and the substrate were vaporized. At the firing temperature, the ceramic powders sintered to produce an integrally bonded substrate. Concurrently, the particulate layer sintered to form an integral film that was tightly bonded to the substrate. Because palladium oxide decomposes at the sintering temperature, sintering may be suitably carried out in air. However, the palladium surface tends to oxidize as the film is cooled below about 900° C. Accordingly, during the cool down, the palladium film was annealed in nitrogen atmosphere at an 850° C. for about 10 minutes to reduce palladium oxide.

The resulting co-fired product featured an electrically resistive thick film that was tightly bonded to the SCT substrate. The films appeared free of cracks or blisters that would otherwise disrupt the electrical continuity of the film. The film thickness was about 4.0 microns and generally uniform, that is, free from cambering that is symptomatic of uneven residual stress and tends to interfere with subsequent processing. The electrical resistance of the film was measured using a 150 square test pattern and found to be about 187 milliohms per square. Thus, the film was deemed well suited for use as a thick film resistor element.

This invention is particularly useful in forming thick films having electrical resistivity greater than about 150 milliohms per square, and preferably between about 150 and 400 milliohms per square. While not wishing to be limited to any particular theory, in the absence of nonmetallic additives, palladium, being a metal, has high electrical conductivity, that is, low resistivity. The dramatic increase in film resistivity is attributed to the boron nitride, which alone exhibits a high resistance beyond a workable range. It is believed that the film formed in accordance with this invention comprises a matrix formed substantially of sintered palladium and also includes a dispersed phase formed of boron nitride. Thus, it is desired to formulate the paste to provide sufficient palladium powder to form a continuous phase. Suitable films are believed to contain at least 50 weight percent palladium. A preferred range is between 80 and 92 weight percent. As used herein, film composition is reported with reference to the proportion and composition of powders in the mixture utilized in the paste, without regard to oxidation or other reactions that may occur during sintering. In forming the film, the particulate layer is heated to a temperature sufficient to sinter the palladium powder. While the powder is preferably formed substantially of palladium, it may include minor alloys to modify film properties, provided such alloys do not compromise the sinterability of the powder.

The usefulness of boron nitride is in part attributed to its relatively high melting point greater than the palladium sintering temperature. It is surprising that relatively small additions of the boron nitride dramatically increased the resistance, particularly in comparison to glass and other ceramic fillers commonly utilized in low temperature thick film resistors. For purposes of comparison, a comparable film was formulated from a paste containing 4.7 weight percent SCT powder, 0.95 weight percent calcium oxide borosilicate glass powder, and palladium powder, but without the boron nitride addition, and exhibited a resistivity of about 50 milliohms per square, well below the range useful for thick film resistors and achieved using a boron nitride addition in accordance with this invention. Boron nitride additions of as little as about 1 percent dramatically increase resistance, particularly in combination with other nonmetallic additives. Additions above about 7.5 weight percent tend to be accompanied by increased porosity within the sintered film, while additions above about 15 weight percent tend to produce cracking that disrupts the film. A preferred range of boron nitride concentrations is between about 2.5 and 7.5 weight percent.

In a second preferred embodiment, an electrically resistive film was formed by a similar process, but utilizing a paste that included, in addition to boron nitride, a tantalum oxide powder to reduce the temperature coefficient of resistance. The powder mixture was composed of 4.7 weight percent SCT powder, 0.95 weight percent calcium oxide borosilicate glass powder, 5.0 weight percent boron nitride powder, 5.0 weight percent tantalum oxide powder and the balance palladium powder. It is noted that the film did not contain silver powder. A sintered film having a thickness of about 4.0 microns was co-fired onto an SCT substrate and had a resistivity of about 210 milliohms per square. However, in comparison to the described film without the tantalum oxide, the film exhibited a temperature coefficient of resistance over a range between −25° C. and +25° C. that was about 20 percent less. In general, tantalum oxide additions between about 2.5 and 7.0 weight percent are suitable to improve the temperature coefficient, with a range between about 4.0 and 5.0 weight percent being preferred.

In the described embodiment, the film also contains minor additions of silver, calcium oxide borosilicate glass and SCT. It is believed that silver is optional and may alloy with the palladium to enhance conductivity of the matrix and reduce palladium oxidation, which oxide is not desired in applications that involve soldering. However, additions greater than about 3 weight percent tend to produce blow holes that disrupt film integrity. Calcium oxide borosilicate glass is added to modify the thermal expansion and thereby reduce spalling. The glass is particularly effective in combination with the tantalum oxide addition. However, additions greater than about 2.5 weight percent calcium oxide borosilicate glass tends to produce cracking and spalling. A preferred glass addition is between 0.5 and 1.5 weight percent. SCT is similarly added to modify thermal expansion characteristics to reduce cracking and improve adhesion and is particularly effective in combination with a compact having a similar titanate composition. When employed, it is desired to limit the titanate addition to less than 5 weight percent to avoid cracking. A preferred SCT addition is between about 1.5 and 4 weight percent.

In formulating the paste, the powders are dispersed in a volatile organic liquid vehicle that is substantially vaporized during drying. For thick film resistors, the paste is applied in sufficient quantity to form a sintered film having a thickness between about 2.5 microns and 12.5 microns. It is a significant advantage of this invention that liquid to solid proportions may be varied to facilitate a selected application technique, since the dried layer is formed almost entirely of the powders. In general, a suitable paste formulated between about 30 and 70 percent powder. The vehicle is preferably based upon an organic solvent that vaporizes without residue and may contain organic additives, for example, a binder or dispersant, that vaporize or decompose during the early stages of heating.

It is a significant advantage of the described embodiment that the substrate and thick film resistor are concurrently formed by a co-firing process, thereby permitting both elements to be formed in a single firing stage. In an alternate embodiment, the substrate may be finished prior to applying the paste to form the film. In general, the substrate may be formed of any suitable refractory material. In forming a resistive film on a substrate that is composed of an alkaline earth titanate compound, such as the SCT material in the described embodiment, it is desirable to minimize bismuth content in the substrate to avoid formation of unwanted compounds with the palladium. As used herein, strontium calcium titanate refers to a titanate compound in which the metal (exclusive of titanium) is predominantly strontium and calcium, preferably within the ranges of the described embodiment, and optionally includes manganese or other minor additives. In general, the applied metal particular layer may be suitably sintered between about 1,000° C. and 1,400° C. This includes a range between about 1,285° and about 1,320° C., preferred in sintering SCT and the like.

While in the described embodiment the paste was applied to form a co-fired thick film resistor on the surface of the substrate, the particulate layer may be coated with a ceramic overlayer, for example, composed of a material similar to the substrate, such as SCT or the like, to build-up a co-fired, multilayer ceramic board. In addition, alternate ceramic and thick film resistor layers may be co-fired in forming a multilayer capacitor.

While this invention has been described in certain embodiments thereof, it is not intended that it be limited to the above description, but rather only to the extent set forth in the claims that follow.

The embodiments of the invention in which an exclusive property or privilege is claimed are defined as follows:

1. An electrically resistive sintered thick film bonded to a ceramic substrate and formed of a sintered metallic matrix composed substantially of palladium metal, a first dispersed phase composed of boron nitride and a second dispersed phase composed of tantalum oxide.

2. An electrically resistive sintered thick film in accordance with claim 1 wherein the film contains between about 1 and 15 weight percent boron nitride and between about 2.5 and 7.0 weight percent tantalum oxide.

3. An electrically resistive sintered thick film in accordance with claim 1 wherein the film contains between about 2.5 and 7.5 weight percent boron nitride and between about 4.0 and 5.0 weight percent tantalum oxide.

4. An electrically resistive sintered thick film in accordance with claim 1 wherein the film further comprises up to about 2.5 weight percent calcium oxide borosilicate glass.

5. An electrically resistive sintered thick film bonded to a ceramic substrate and formed of a sintered metallic film consisting essentially of between about 1 and 15 weight percent boron nitride, between about 2.5 and 7.0 weight percent tantalum oxide, up to about 3 weight percent silver, up to about 2.5 weight percent calcium oxide borosilicate glass, up to about 5 weight percent alkaline earth titanate, and the balance palladium, said film being further characterized by dispersed phases of said boron nitride and said tantalum oxide.

6. An electrical component comprising a ceramic substrate and a thick film resistor bonded to the substrate, said thick film resistor being formed of a sintered metallic film having a matrix composed substantially of palladium metal, a first dispersed phase composed of boron nitride and a second dispersed phase composed of tantalum oxide.

7. An electrical component resistor in accordance with claim 6 wherein the film contains between about 1 and 15 weight percent boron nitride and between about 2.5 and 7.0 weight percent tantalum oxide.

8. An electrical component in accordance with claim 6 wherein the film contains between about 2.5 and 7.5 weight percent boron nitride and between about 4.0 and 5.0 weight percent tantalum oxide.

9. An electrical component comprising a ceramic substrate and a thick film resistor bonded to the substrate, said thick film resistor being formed of a sintered metallic film consisting essentially of between about 1 and 15 weight percent boron nitride, between about 2.5 and 7.0 weight percent tantalum oxide, up to about 3 weight percent silver, up to about 2.5 weight percent calcium oxide borosilicate glass, up to about 5 weight percent alkaline earth titanate, and the balance palladium, said boron nitride and said tantalum oxide being present in dispersed phases effective to significantly increase electrical resistance.

10. An electrical component in accordance with claim 9 wherein the substrate is formed of an alkaline earth titanate compound.

11. An electrical component in accordance with claim 9 wherein the substrate is formed of an alkaline earth titanate compound compositionally similar to the alkaline earth titanate in the film.

12. An electrical component in accordance with claim 9 wherein the substrate is a sintered ceramic substrate.

13. An electrical component in accordance with claim 9 wherein the substrate is formed of a strontium calcium titanate compound.

14. An electrical component in accordance with claim 9 wherein the film contains between about 2.5 and 7.5 weight percent boron nitride, between about 4.0 and 5.0 weight percent tantalum oxide and between about 80 and 92 weight percent palladium.

15. A paste for forming an electrically resistive, sintered palladium film, said paste comprising a vaporizable liquid vehicle and a mixture of powders dispersed in the vehicle, said mixture comprising about 1 and 15 weight percent boron nitride powder and between about 2.5 and 7.0 weight percent tantalum oxide powder and the balance predominantly sinterable palladium powder.

16. A paste in accordance with claim 15 wherein the mixture contains between about 80 and 92 weight percent palladium powder.

17. A paste in accordance with claim 15 wherein the mixture contains between about 2.5 and 7.5 weight percent boron nitride powder.

18. A paste in accordance with claim 15 and further comprising an expendable organic binder.

19. A paste in accordance with claim 15 wherein the mixture comprises between about 4.0 and 5.0 tantalum oxide powder.

20. A paste for forming an electrically resistive, sintered palladium film, said paste comprising a vaporizable liquid vehicle containing an expendable organic binder and further comprising a mixture consisting essentially of between about 1 and 15 weight percent boron nitride powder, between about 2.5 and 7.0 weight percent tantalum oxide powder, up to about 3 weight percent silver powder, up to about 2.5 weight percent calcium oxide borosilicate glass powder, up to about 5 weight percent alkaline earth titanate powder, and the balance palladium powder.

21. A paste in accordance with claim 20 wherein the alkaline earth metal titanate powder is composed of a strontium calcium titanate compound.

* * * * *